United States Patent Office 3,158,087
Patented Nov. 24, 1964

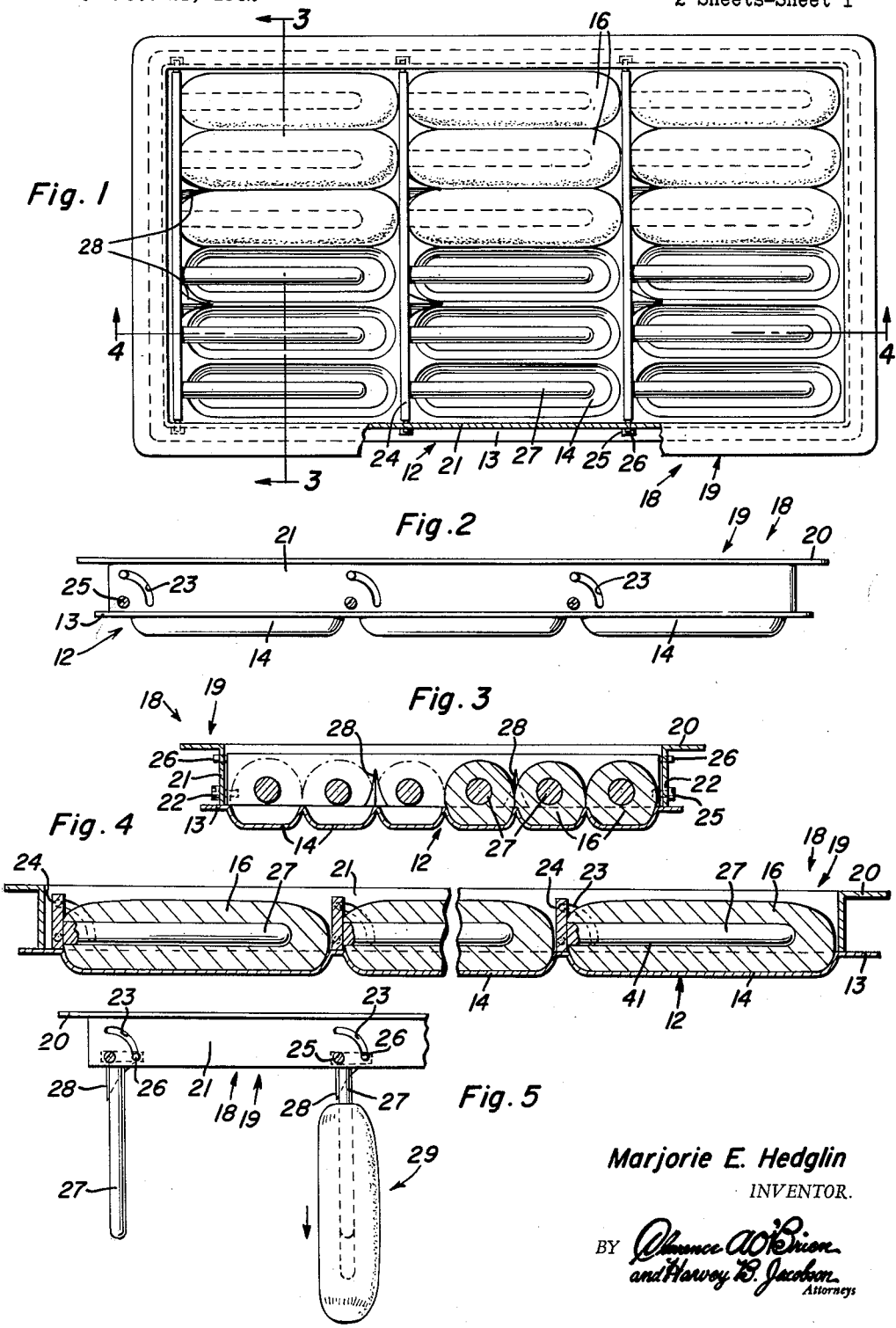

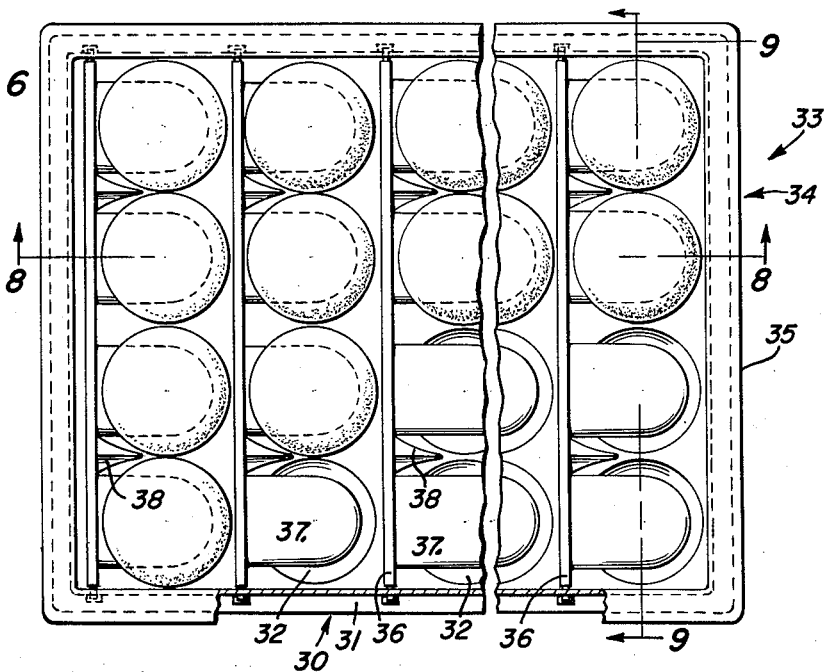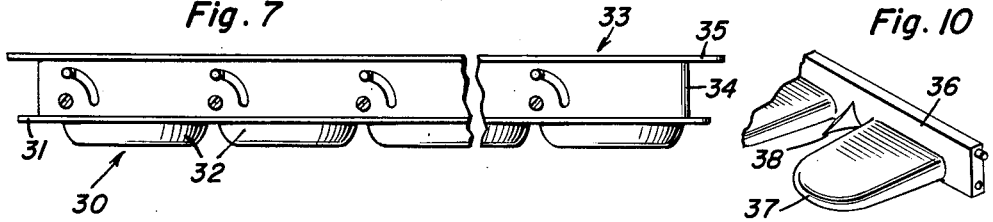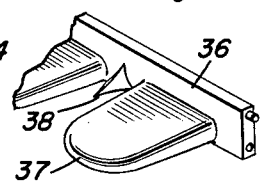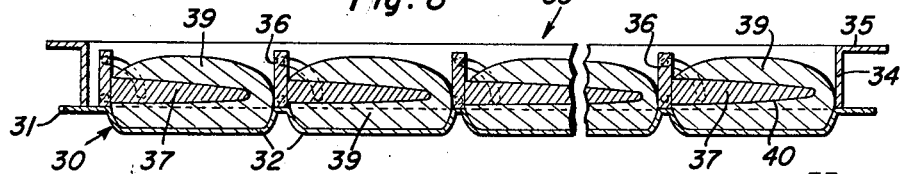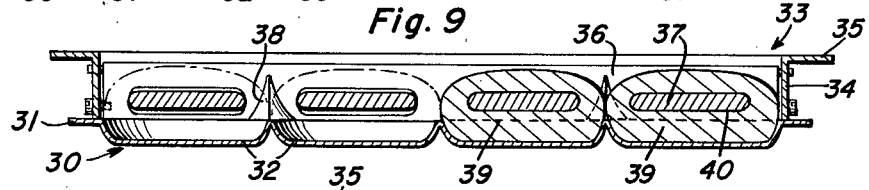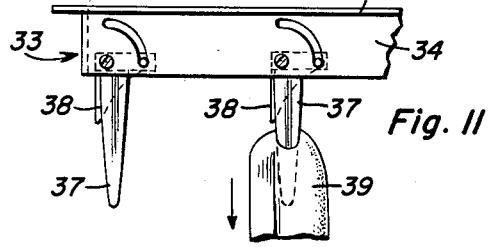

3,158,087
SANDWICH BUN MOLD
Marjorie E. Hedglin, 1029¾ E. 6th St., Tucson, Ariz.
Filed Dec. 21, 1962, Ser. No. 246,595
3 Claims. (Cl. 99—439)

The present invention relates to new and useful improvements in bun baking molds and is a continuation-in-part of my co-pending application Serial No. 3,539, filed January 20, 1960, and now abandoned.

The primary object of the present invention is to provide, in a manner as hereinafter set forth, a mold of the character described which is intended particularly although not necessarily, for baking sandwich rolls of the finger and bun types, and which comprises novel means for forming in the finished product a bore or pocket for the reception of a filler such as a frankfurter, ground beef, relish, etc.

Another highly important object of this invention is to provide an improved baking mold of the aforementioned character embodying a unique construction, combination and arrangement of parts whereby the baked rolls or buns may be expeditiously removed.

Other objects are to provide an improved sandwich bun baking mold of the character set forth which is comparatively simple in construction, strong, durable, compact, of light weight, sanitary and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a frankfurter bun mold constructed in accordance with the present invention, a portion of the device being broken away in section;

FIGURE 2 is a view in side elevation of the device;

FIGURE 3 is a view in transverse section on a slightly enlarged scale, taken substantially on the line 3—3 of FIGURE 1;

FIGURE 4 is a longitudinal sectional view of an enlarged scale, taken substantially on the line 4—4 of FIGURE 1;

FIGURE 5 is a side elevational view of an end portion of the rack, showing the cores in position for the removal of the baked product;

FIGURE 6 is a top plan view substantially similar to FIGURE 1 but showing another embodiment of the device adapted for forming barbecue rolls;

FIGURE 7 is a view in side elevation of the modification;

FIGURE 8 is a view in longitudinal section on an enlarged scale, taken substantially on the line 8—8 of FIGURE 6;

FIGURE 9 is a view in transverse section on an enlarged scale, taken substantially on the line 9—9 of FIGURE 6;

FIGURE 10 is a fragmentary detailed view in perspective of one of the core units; and FIGURE 11 is a side elevational view of an end portion of the rack, showing the cores in position for the removal of the baked product.

Referring now to the drawing in detail, it will be seen that reference numeral 12 generally designates a substantially rectangular pan of suitable metal and dimensions. The pan 12 includes a bottom or plate 13 having formed integrally therewith transverse series of pockets, depressions or trays 14. The pan 12 may comprise any desired number of the depressions or trays 14. It will be observed that the depressions or trays 14 of the pan 12 are elongated and extend longitudinally, said depressions or trays being for the reception of dough, as indicated at 16, for baking elongated finger or frankfurter rolls.

A rack or core unit 18 is removably mounted on the pan 12. The core unit 18 includes a generally rectangular metallic frame 19 of such dimension that said frame may rest on the marginal portions of the pan bottom or plate 13. The frame 19 includes a horizontal top flange 20 to facilitate mounting said frame on the pan and to facilitate removing said frame therefrom.

The longitudinal sides 21 of the frame 19 have formed in the lower portions thereof longitudinally spaced holes or openings 22. Arcuate slots 23 are also provided in the frame members 21 concentric with the openings 22. Flat metallic bars 24 are mounted transversely in the frame 18 for swinging or rocking movement. Toward this end, the ends of the bars 24 are provided with pivot screws or trunnions 25 which are journaled in the openings 22. Stop pins 26 on the upper portions of the bars 24 project from the ends thereof and are operable in the arcuate slots 23.

Spaced parallel cores 27 are affixed to the bars 24 and adapted to project longitudinally therefrom over the depressions or trays 14. Also projecting from the bars 24 between certain of the cores 27 are arms or tongues 28 which are adapted to rest on the pan bottom or plate 13 for supporting the cores 27 in a horizontal position over the trays or recesses 14.

It is thought that the operation of the device will be readily apparent from a consideration of the foregoing. Briefly, the dough 16 may be applied to the cores 27 in any suitable manner. For example, the dough 16 may be placed in the trays 14, the cores 27 lowered thereon and said dough then wrapped around said cores. Or, if a steam process is used the dough may be permitted to rise and cover the cores. Still further, the frame 19 may be inverted and the cores 27 swung upwardly to a vertical position to permit the dough to be applied thereto. When the buns, as indicated at 29, have been baked, the unit 18 is lifted off the pan 12. The cores 27 swing downwardly as shown in FIGURE 5 of the drawing for permitting the buns 29 to slide therefrom by gravity. Or, if necessary, the finished buns may be stripped from the depending cores in any suitable manner. The procedure may now be repeated. The construction and arrangement of parts, it will be noted, is such that the complete apparatus may be easily cleaned and maintained in a highly sanitary condition at all times.

The embodiment of FIGURES 6 to 11, inclusive, of the drawing is for baking barbecue rolls of the circular or bun type. Toward this end, a pan 30 is provided. The pan 30 includes a substantially rectangular metallic bottom or plate 31 of suitable dimensions having formed integrally therewith series of circular depressions or trays 32. A rack or core unit 33 is removably mounted on the pan 30. The unit 33 is substantially similar to the unit 18, in that it comprises a rectangular frame 34 having a top flange 35. Spaced parallel transverse bars 36 are mounted for swinging or rocking movement in the frame 34 of the unit 33 substantially in the manner of the bars 24. Substantially wedge-shaped cores 37 are affixed to the bars 36 and adapted to project therefrom over the trays or depressions 32 of the pan 30. Arms 38 also project from the bars 36 and are adapted to rest on the bottom or plate 31 of the pan 30 for supporting the cores 37 in a substantially horizontal position over the trays or depressions 32.

In FIGURES 8, 9 and 11 of the drawing, reference numeral 39 designates buns being baked in the trays or depressions 32 on the cores 37. The cores 37, being substantially wedge-shaped, as shown, form correspondingly shaped open pockets in the buns 39 in an obvious manner.

These pockets or bores are indicated at 40. In the embodiment of FIGURE 4 of the drawing, the corresponding pockets or bores are indicated at 41. In other respects, the embodiment of FIGURE 6 of the drawing is substantially similar in construction and operation to the embodiment of FIGURE 1 of said drawing.

The foregoing is considered as illustrative only of the principles of the invention. Further, since numerous modifications and changes will readily occur to those skilled in the art, it is not desired to limit the invention to the exact construction and operatoin shown and described, and accordingly all suitable modifications and equivalents may be resorted to, falling within the scope of the invention as claimed.

What is claimed as new is as follows:

1. A two-piece bun baking mold comprising a mold pan and a mold frame cooperating therewith and detachably mounted thereon, said mold pan having a closed horizontal wall with a laterally projecting coplanar marginal flange together with a plurality of portions downwardly dished from said wall defining baking compartments and disposed in a transverse row, said mold frame having side and end walls and being open at its top and bottom, said frame walls being removably seated at their lower edges upon said pan flange, a support bar having its ends pivotally journaled in said side walls and extending transversely across said frame adjacent said transverse row of compartments, a plurality of mold cores fixedly mounted upon and projecting laterally in coplanar relation from said support bar, the lowermost edges of said mold cores and said lower edges of said frame walls being substantially coplanar, said support bar being movable about its pivoted ends between a baking position with its cores disposed in the frame plane and with each core in overlying medially positioned relation to one of said compartments with its lowermost edge substantially in the plane of said pan wall and a dumping position with the frame removed from said pan and with its cores disposed perpendicularly to and downwardly of the frame plane, a support arm on said support bar intermediate the ends thereof and extending in the direction of and substantially in the plane of said cores, said arm being engaged with said pan wall and supporting and retaining said support bar and the associated cores in said baking position and being disengaged from said pan and freeing said support bar and cores for gravity movement into said dumping position when said frame is removed from said pan.

2. The combination of claim 1 wherein said baking compartments are disposed in a plurality of longitudinally spaced transverse rows and including a support bar and cores thereon for each transverse row of compartments.

3. The combination of claim 1 including a slot in each frame side wall, said support bar having a stop pin on each end thereof, each stop pin being movably received in an associated slot and positively limiting pivoting of the associated support bar to movement between said baking and dumping positions.

References Cited in the file of this patent

UNITED STATES PATENTS

| | | |
|---|---|---|
| 175,040 | Crane | Mar. 21, 1876 |
| 1,139,037 | Huth | May 11, 1915 |
| 2,168,006 | Strietelmeier | Aug. 1, 1939 |
| 2,252,990 | Smith | Aug. 19, 1941 |

FOREIGN PATENTS

| | | |
|---|---|---|
| 55,484 | Austria | Sept. 25, 1912 |